(12) United States Patent
Crowe et al.

(10) Patent No.: US 9,210,204 B2
(45) Date of Patent: Dec. 8, 2015

(54) SYNCHRONIZING MEDIA PRESENTATION AT MULTIPLE DEVICES

(71) Applicant: AT&T Intellectual Property I, LP, Atlanta, GA (US)

(72) Inventors: Keith Crowe, Austin, TX (US); Dan Agostino, Austin, TX (US); Filinto Duran, Austin, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 193 days.

(21) Appl. No.: 14/068,916

(22) Filed: Oct. 31, 2013

(65) Prior Publication Data

US 2015/0120953 A1    Apr. 30, 2015

(51) Int. Cl.
H04L 29/06        (2006.01)
H04L 29/08        (2006.01)

(52) U.S. Cl.
CPC .............. *H04L 65/60* (2013.01); *H04L 65/608* (2013.01)

(58) Field of Classification Search
None
See application file for complete search history.

(56) References Cited

U.S. PATENT DOCUMENTS

| | | | |
|---|---|---|---|
| 5,213,510 A * | 5/1993 | Freeman ..................... | 434/321 |
| 5,340,317 A * | 8/1994 | Freeman ..................... | 434/321 |
| 5,724,091 A * | 3/1998 | Freeman et al. .............. | 725/138 |
| 5,815,634 A | 9/1998 | Daum et al. | |
| 6,160,548 A | 12/2000 | Lea et al. | |
| 6,778,493 B1 * | 8/2004 | Ishii ............................. | 370/229 |
| 7,653,091 B2 | 1/2010 | Kwong et al. | |
| 8,190,680 B2 | 5/2012 | Spilo et al. | |
| 8,234,395 B2 * | 7/2012 | Millington .................... | 709/231 |
| 8,463,875 B2 | 6/2013 | Katz et al. | |
| 2003/0097478 A1 * | 5/2003 | King ............................. | 709/248 |
| 2004/0139474 A1 * | 7/2004 | Carro ............................ | 725/112 |
| 2006/0002681 A1 * | 1/2006 | Spilo et al. .................... | 386/46 |
| 2007/0011237 A1 | 1/2007 | Mockett | |
| 2007/0038999 A1 * | 2/2007 | Millington .................... | 718/100 |
| 2007/0110074 A1 * | 5/2007 | Bradley et al. ........... | 370/395.51 |
| 2009/0106357 A1 * | 4/2009 | Igelman et al. .............. | 709/203 |
| 2011/0045794 A1 * | 2/2011 | Conners et al. .............. | 455/345 |
| 2011/0083073 A1 * | 4/2011 | Atkins et al. .................. | 715/704 |
| 2011/0276648 A1 | 11/2011 | Soldan | |
| 2012/0042047 A1 | 2/2012 | Chen et al. | |
| 2012/0051543 A1 * | 3/2012 | Evans et al. ................... | 380/270 |
| 2012/0082424 A1 | 4/2012 | Hubner et al. | |
| 2013/0007819 A1 | 1/2013 | Choi et al. | |
| 2013/0268980 A1 * | 10/2013 | Russell .......................... | 725/75 |
| 2014/0013008 A1 * | 1/2014 | Lazarus et al. ............... | 709/248 |
| 2014/0096169 A1 * | 4/2014 | Dodson et al. ................. | 725/97 |

* cited by examiner

*Primary Examiner* — Sargon Nano
(74) *Attorney, Agent, or Firm* — Guntin & Gust, PLC; Ralph Trementozzi (57) ABSTRACT

A system that incorporates the subject disclosure may include, for example, a device to perform operations including determining, a first playback latency of a streaming media signal at a first media processor and a second playback latency of the same signal at a second media processor. A coordinated time is determined according to a target latency not less than a greater of the first and second playback latencies. A first buffer, when adjusted by a first buffer value, causes an in-content reference to be encountered at the coordinated time during playback by the first media processor. Likewise, a second buffer, when adjusted by a second buffer value, causes the in-content reference to be encountered at the coordinated time during playback by the second media processor. The suitably adjusted buffers allow playback of the streaming media to be synchronized between the first and second media processors. Other embodiments are disclosed.

20 Claims, 7 Drawing Sheets

SYNCHRONIZING MEDIA PRESENTATION AT MULTIPLE DEVICES

FIELD OF THE DISCLOSURE

The subject disclosure relates to a synchronizing media presentation at multiple devices.

BACKGROUND

Traditional wide-area broadcast media, such as television and radio, deliver media content simultaneously to a large number of media reception devices within a broadcast area of coverage. The multiple media reception devices within the broadcast area of coverage, e.g., multiple televisions and/or radios, would all receive the broadcast media content at the same time, such that the received broadcast media content would be processed, e.g., decoded, demodulated, and presented to viewers and/or listeners at the same time. Consequently, all media reception devices within the broadcast area of coverage that are receiving the same content, e.g., tuned to the same channel, would be perceived as being synchronized with respect to each other. By way of illustrative example, consider the television display area of an electronics store in which multiple televisions are tuned to the same station—the audio and video appear to be synchronized. The same would be true for multiple media reception devices within a viewer's/listener's home.

BRIEF DESCRIPTION OF THE DRAWINGS

Reference will now be made to the accompanying drawings, which are not necessarily drawn to scale, and wherein.

DETAILED DESCRIPTION

Digital technologies as applied to the distribution and processing of media content can provide for improved quality, better management of signal bandwidth, and so forth. Unfortunately, such digital technologies can introduce new issues that can lead to unsynchronized presentation of media content at a common location, e.g., a home or television display area of an electronics store. Digital media content distribution systems do not necessarily ensure the type of playback synchronization that was inherent in traditional broadcast technologies.

The subject disclosure describes, among other things, illustrative embodiments of determining playback latency values associated with a streaming media signal at each of a group of media processors, determining a target playback latency that is not less than a greater of the playback latency values, and determining a coordinated playback time according to the target playback latency. Buffers associated with the group of media processors are adjusted for each of the multiple media processors to cause a first in-content reference to be encountered at the coordinated playback time during playback. Other embodiments are included in the subject disclosure.

The techniques disclosed herein allow an end user to experience synchronize playback of streaming media content across multiple media playback devices, e.g., multiple media playback devices located within the user's home. Accordingly, presentation of streaming media on one media playback device are not played out ahead of another when synchronized. For example, the user can select a "synchronize content" option on any of the media playback devices (set-top box, receiver, etc.) in their home. Selection of the option induces a synchronization request that can be used to initiate a process by which all of the media playback devices send decode time information to a synchronization controller adapted to calculate time deltas for each of the media playback devices. The time deltas can be used to determine time delays that when incorporated into presentation of the streaming media tend to synchronize presentation of the media content among the media playback devices. Each media playback can receive an indication of the time deltas information and add the corresponding latency, or delay, until they all synchronize and re-start play out at a specific time or media frame.

One embodiment of the subject disclosure includes a process that includes receiving, by a controller including a processor, a synchronization request. In response to receiving of the synchronization request the controller performs the following actions, including determining a first playback latency of a streaming media signal at a first media processor and a second playback latency of the streaming media signal at a second media processor. The controller determines a greater of the first and second playback latencies and determines, according to the greater of the first and second playback latencies, a coordinated playback time at which a first in-content reference is to be encountered during playback. A first buffer, when adjusted by a first buffer value, causes the first in-content reference to be encountered at the coordinated time during playback by the first media processor. Likewise, a second buffer, when adjusted by a second buffer value, causes the first in-content reference to be encountered at the coordinated time during playback by the second media processor. The preceding actions result in a synchronized playback of the streaming media between the first and second media processors.

Another embodiment of the subject disclosure includes a machine-readable storage device. The machine-readable storage device includes instructions that when executed cause a processor to perform operations including determining a first playback latency of a streaming media signal at a first media processor and a second playback latency of the streaming media signal at a second media processor. The operations further include determining a target playback latency that is not less than a greater of the first playback latency and the second playback latency and determining a coordinated playback time, according to the target playback latency. A first buffer, when adjusted by a first buffer value, causes a first in-content reference to be encountered at the coordinated time during playback by the first media processor. Likewise, a second buffer, when adjusted by a second buffer value, causes the first in-content reference to be encountered at the coordinated time during playback by the second media processor. The preceding operations result in a synchronized playback of the streaming media between the first and second media processors.

Yet another embodiment of the subject disclosure includes a device that includes a memory to store executable instructions and a processor coupled to the memory. The processor, responsive to executing the instructions, performs operations that include determining a first playback latency of a streaming media signal at a first media processor and a second playback latency of the streaming media signal at a second media processor. The operations further include determining a target playback latency not less than a greater of the first and second playback latencies, and a coordinated playback time, according to the target playback latency. A first buffer, when adjusted by a first buffer value, causes a first in-content reference to be encountered at the coordinated playback time during playback by the first media processor. Likewise, a second buffer, when adjusted by a second buffer value, causes the first in-content reference to be encountered at the coordinated playback time during playback by the second media processor. The preceding operations result in a synchronized playback of the streaming media between the first and second media processors.

Figure 1:
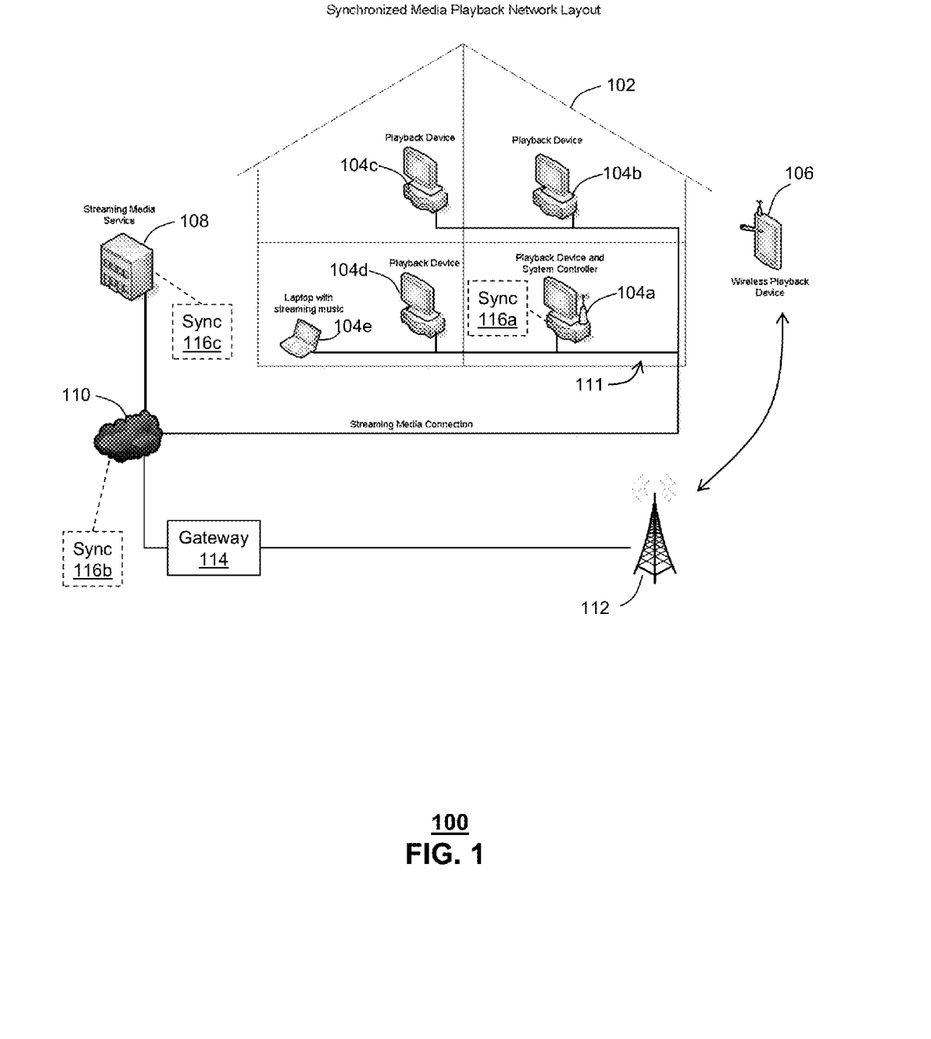
FIG. 1 depicts an illustrative embodiment of synchronized media playback network layout.

FIG. 1 depicts an illustrative embodiment of a synchronized media playback network 100. The network 100 includes a streaming media server 108 providing media content by way of a streaming media signal to number of media playback devices 104a, 104b, 104c, 104d, 104e (generally 104). The media playback devices 104 can be positioned at various locations within a vicinity of each other, e.g., within a home 102. The media playback devices 104 can be hard wired to a network, such as an in-home network 111, e.g., Ethernet, and/or in communication with a wireless network, e.g., WiFi, Bluetooth. In some instances, a playback device can include a mobile media playback device 106, such as a smart phone, a tablet device, or the like. It is foreseeable that such mobile devices can also be operated within the home 102.

Streaming media services can be delivered by the streaming media server 108 by way of a transport network 110, such as a packet-switched network, e.g., the Internet, a cable network, analog and/or digital subscriber lines, e.g., using DSLAMs, satellite networks, or any other suitable network or combination thereof adapted to transport streaming media content from the streaming media server 108 to the one or more media playback devices 104, 106. In some instances, streaming media services can be delivered by way of a radio cellular network 112. For example, a radio cellular network provider can provide an internet gateway server 114 in communication with the streaming media server 108, e.g., through a terrestrial network, such as packet switched network, e.g., the transport network 110. It should be understood that delivery of streaming media over such transport networks 110 can be accomplished to a much wider community than the single home 102 in the illustrative example. For example, a local broadcast channel can be distributed to a large number of homes and/or media devices within a local region, such as a city, county or state. Alternatively or in addition, a national broadcast channel can be distributed to homes and media devices across a country.

Synchronization or timing discrepancies can result from one or more sources, such as differences in transport latency of streaming media content from the streaming media server 108 to each of the different media playback devices 104, 106. Alternatively or in addition, synchronization or timing discrepancies can result from media processing performed at each of the media processors and the mobile media playback device 106 resulting in a processing latency. Some examples of media processing performed at the media playback devices 104, 106 can include a decoding step, e.g., according to encoding and/or data compression applied at the streaming media server. Some examples of encoding include standards adopted by the Moving Picture Experts Group (MPEG). Other examples include MP3. The decoded media can be rendered for presentation to a user or viewer, e.g., as audio, video and audio-video. Other examples of processing that can be applied, depending upon the application, include one or more of frame rate conversion, color space conversion, noise reduction, enhancement, motion compensation, color calibration, de-interlacing.

Without special provisions, it is possible for digital media content distribution and processing systems to allow in-home systems, e.g., media playback devices 104 and mobile media playback devices 106, to become unsynchronized with respect to each other. Such a lack of synchronization can cause some systems, e.g., a first media playback device 104a in a living room to playback media content ahead of, or behind, playback of the same media content on other systems, e.g., at a second media playback device 104d in a nearby family room. This lack of synchronization can create problems, particularly for live and time sensitive media content such as the ball drop at Times Square on New Year's Eve, live sporting events, shows including reality shows and shows that incorporate viewer audience participation, such as AMERICAN IDOL®, a trademark of FremantleMedia North America, Inc., streaming music channels, and other events. It is understandable that playback of unsynchronized media content, e.g., at the same venue, can be disruptive and essentially ruin the user experience, particularly for live presentations when a result, timing and so forth are unexpected. By way of illustrative example, one group of viewers of an event, such as the SUPER BOWL®, a registered trademark of the National Football League, at the first media playback device 104a in the living room of the home 102 viewing the event ahead of the second media playback device 104d in a nearby family room can cause the viewers in the family room to realize big plays before they happen, thereby eliminating the suspense and otherwise ruining the game experience.

Other examples in which such timing issues can occur while viewing in-home content, include listening to streaming music locally from a personal media playback device, such as an iPod®, or remotely from a streaming media service such as Pandora®, e.g., using multiple audio playback devices around the home 102. There are various ways to stream music and various devices to stream with; however, similar timing issue can result when the content, or song, plays out at different times on different devices, causing issues with unsynchronized playback, e.g., throughout the house.

The network 100 includes one or more synchronization controllers 116a, 116b, 116c (generally 116), shown in phantom. The synchronization controller(s) 116 can operate, as disclosed herein, to coordinate playback synchronization of a group of media playback devices 104, 106. The synchronization controller 116 can determine playback latencies among a group of media playback devices 104, 106, e.g., such as those at or near a home 102 or business (e.g., retail electronics store), or those of any common viewer community or audience that can be geographically collocated or separate. The synchronization controller 116 can further determine a coordinated playback time according to the playback latencies, and disseminate the coordinated playback time or similar parameter to buffers associated with the media playback devices 104, 106, to adjust playback of streaming media from the streaming media server 108 one or more of the media playback devices 104, 106 such that synchronized playback is obtained among the group of media playback devices 104, 106.

In some embodiments, the synchronization controller 116a can be provided within a proximity of at least one of the media playback devices 104, 106 to be synchronized, e.g., within the home 102. Such a local synchronization controller 116a can be provided as a stand-alone unit in communication with one or more of the media playback devices 104, 106, e.g., through the in-home network 111. It is conceivable that the synchronization controller 116a can be provided within at least one of the media playback devices 104. Alternatively or in addition, the synchronization controller 116b can be provided as a network accessible device, e.g., in communication with the transport network 110. Such a network-accessible synchronization controller 116b can be located within the home 102, or external to the home 102, as shown. In yet another configuration, the synchronization controller 116c can be located at or within the streaming media server 108. It is understood that any of the synchronization controllers 116 can be configured to provide synchronization to more than one group of media playback devices 104, 106, e.g., servicing other homes in a similar manner, e.g., with common synchronization services according to all synchronized devices, or with synchronization services common only to each particular home, such that media playback devices 104, 106 within each of a number of homes provide synchronized playback with respect to each other, but not necessarily with respect to media playback devices 104, 106 of another one of the homes receiving synchronization services.

The streaming media server 108 can be operated by a streaming media service provider. Some example services include, without limitation, Internet television or Web television, Internet Protocol television (IPTV), catch-up TV, Internet radio. Other example services include Netflix®, a registered trademark of NetFlix.com, Inc., Hulu Plus™, a trademark of Hulu, LLC, PBS®, a registered trademark of the Public Broadcasting Service Corp., iTunes®, a registered trademark of Apple Computer, Inc., Amazon Prime® streaming, a registered trademark of Amazon Technologies, Inc., and Vdio®, a registered trademark of Pulser Music Services, Inc. Examples of streaming media service providers can include, without limitation, such presently available music service providers as Spotify®, a registered trademark of Spotify AB, Deezer®, a registered trademark of Blogmusik, Napster®, a registered trademark of Rhapsody International, Inc., MySpace® Music, a registered trademark of MySpace Inc., Blinkbox Music, Rdio®, a registered trademark of Rdio, Inc., Sony Music® unlimited, a registered trademark of Sony Corporation, Verdict, Play Music All Access, and Pandora® Internet Radio, a registered trademark of Pandora Media, Inc.

Figure 2:
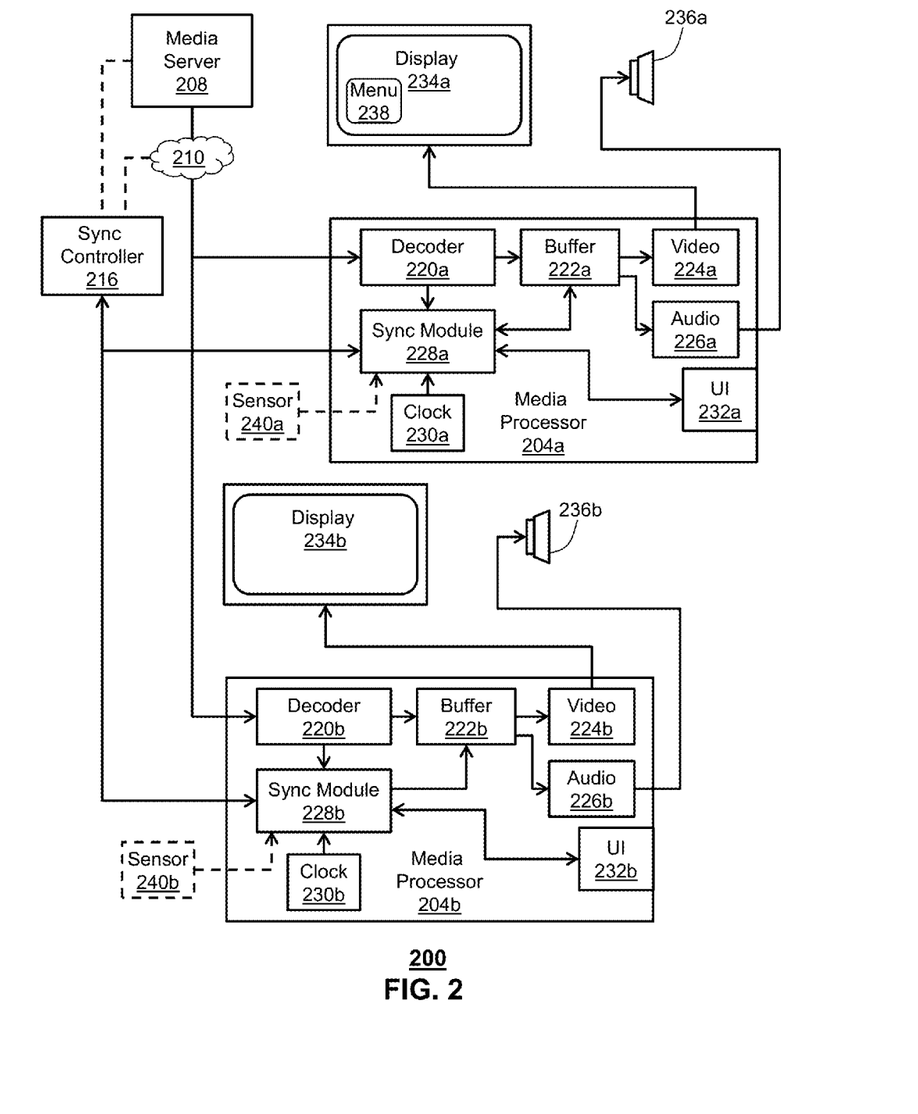
FIG. 2 depicts, in more detail, an illustrative embodiment of a portion of the synchronized media playback network layout described in FIG. 1.

FIG. 2 depicts, in more detail, an illustrative embodiment of a portion of the synchronized media playback network layout 200 described in FIG. 1. The system 200 includes a first media processor, e.g., playback device 204a, a second media processor, e.g., playback device 204b and a synchronization ("sync") controller 216. The first media playback device 204a includes a decoder 220a, a buffer 222a, a video module 224 and an audio module 226a. The decoder 220 receives a streaming media signal, e.g., from a streaming media server 208. An output of the decoder 220a is coupled to an input of the buffer 222a. A first output of the buffer 222a is coupled to an input of the video module 224a and a second output of the buffer 222a is coupled to an input of the audio module 226a. An output of the video module 224a is coupled to an input of a first video display 234a. Likewise, an output of the audio module 226a is coupled to an input of a first audio playback system 236a.

The first media playback device 204a also includes one or more of a synchronization ("sync") module 228a, a reference timing source, such as a reference clock 230a and a user interface 232a. The sync module 228a receives a first input from the sync controller 216 and a second input from the reference clock 230a. The sync module 228a is in communication with the user interface 232a, e.g., to allow a user to interact with the sync module 228a, e.g., to initiate synchronization and/or to otherwise establish rules related to synchronization of playback between the first and second playback devices 204a, 204b.

In operation, a streaming media signal from the streaming media server 208 is received at the first media playback device 204a. The streaming media signal is decoded at the decoder 220a, e.g., according to an encoding protocol applied by the streaming media server 208 or other source of the media content. Examples of encoding protocols include those according to standards determined by working groups or standards bodies, such as the MPEG working group. An output of the decoder 220a is temporarily stored and played out of the buffer module 222a. Although a single buffer 222 is shown for both audio and video, it is conceivable that in at least some embodiments, separate video and audio buffers can be used. The buffered video output is directed to the video processing module 224a, while the buffered audio output is directed to the audio processing module 226a. The video processing module can further process the video signal, including forwarding video frames to the first video display 234a for presentation to a user. The audio processing module 226a can further process the audio signal, including converting digital audio to an analog audio signal for presentation at the audio playback system 236a.

The buffer module 222a is adjustable according to the media input received from the sync module 228a. For example, a buffer length or depth, e.g., a delay transit time for media traversing the buffer 222a, can be adjusted according to the input from the sync module 228. The delay transit time can be determined as a time at which a particular media input, e.g., a video frame, is received at the buffer 222a and the time at which the particular media input is played out at the buffer 222a. The sync module 228a is in communication with the sync controller 216. Accordingly, the sync module 228a can receive an input from the sync controller 216a, e.g., a coordinated playback time associated with an in-content reference. The sync module 228a can also receive an input from the decoder 220a, e.g., indicating when the in-content reference has been encountered. The sync module 228a can determine a buffer depth according to a current buffer depth setting and the coordinated playback time, and a local time reference 230a.

The second media playback device 204b also includes a decoder 220b, a buffer 222b, a video module 224b and an audio module 226b, a sync module 228b, a reference clock 230b and a user interface 232b, configured similar to those disclosed above in relation to the first playback device 204a. The streaming media signal from the streaming media server 208 is received at the second media playback device 204b and processed in a manner similar to the first media playback device 204a, with a significant difference being that the setting of the buffer 222b of the second media playback device 204b can differ from the setting of the buffer 222a of the first media playback device 204a. Likewise, a time at which the in-content reference is presented to the sync module 228a of the first media playback device 204a can differ from a time at which the in-content reference is presented to the sync module 228b of the second media playback device 204b. Generally, the local time reference 230a of the first media playback device 204a will provide the same time as the local time reference 230b of the second media playback device 204b.

Although the buffers 222 are depicted between the decoder 200 and the video and/or audio modules 224, 226, it is understood that the buffers 222 can be included at other locations. For example, the buffers 222 can be located at an output of one or more of the video and audio modules 224, 226. In at least some embodiments, one or more of the buffers 222 can be located within the media playback device 204 as shown, or external to the media playback device 204. For example, the buffers 222 could be provided within one or more of a standalone buffer module (not shown) or a gateway processor (e.g., 504, FIG. 5). Although video and audio processors 224, 226 are shown, it is conceivable that one or more of them could be unnecessary, e.g., the corresponding functionality being provided by the decoder 220.

Once the buffers 222a, 222b have been suitably adjusted, such that the in-content reference is encountered at an output of the buffer 222a, 222b at the prescribed coordinated playback time, presentation of the video at the first and second video displays 234a, 234b is synchronized. Likewise, presentation of the audio at the first and second audio playback systems 236a, 236b is also synchronized.

Figure 3:
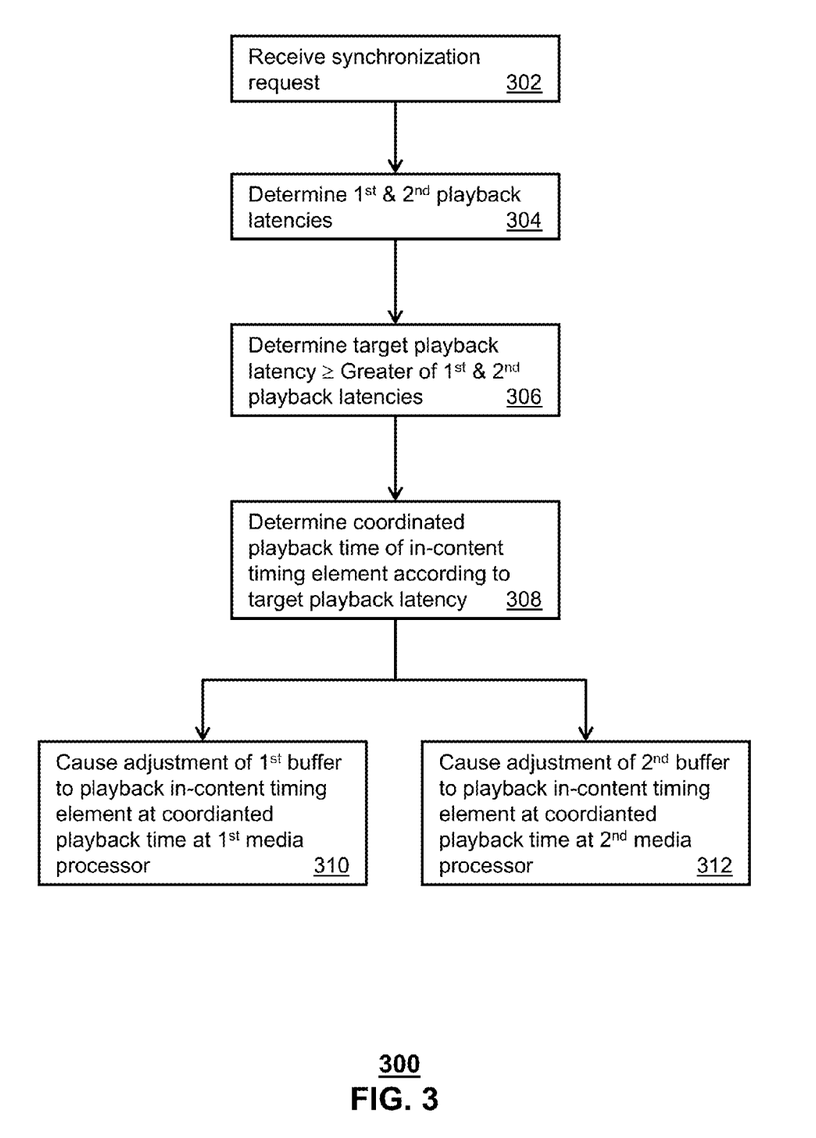
FIG. 3 depicts an illustrative embodiment of a process used in portions of the system described in FIGS. 1-2.

FIG. 3 depicts an illustrative embodiment of a process used in portions of the system described in FIGS. 1-2. A synchronization request is received at 302. The synchronization request can be received at the sync controller 216, either directly from the media processor 204a or by way of an intermediate device or module, such as the sync module 228a. The synchronization request can be initiated by a user action, e.g., selection of a synchronize option from a user interface 232a of the media playback device 204a (FIG. 2). For illustrative purpose, reference is made to the first media playback device. For example, the media processor 204 can include a media sync actuator, e.g., button, on a front panel. When actuated, e.g., depressed, the sync actuator causes a sync request message to be sent to one of a sync module 228a, 228b of the media processor 204 or the sync controller 216. As disclosed above, the sync controller 216 can be incorporated into one or more of the media processors 204 or as a separate device, as illustrated in FIG. 2.

Alternatively or in addition, the synchronization request can be initiated by user selection of a menu item, e.g., that can be navigated to and selected from a menu 238 displayed on the display 234a. Alternatively or in addition, the synchronization request can result from a predetermined event. Examples of such events include power-on, channel change, passage of a predetermined amount of time, e.g., a resynchronization time, access to stored media, e.g., use of a digital video recorder. Other events that can be used to initiate a resynchronization command can include accessing by way of the media playback device one or more of an electronic program guide, an application ("app"), accessing communication features, such as a voice and/or video call, accessing a voice mailbox and so forth. It should be understood that although the features are disclosed in relation to the first media playback device 204a, similar features can be implemented on the second media playback device, e.g., such that a synchronization request can be initiated from either the first or second media playback device.

Other events can be determined upon input from one or more sensor devices. Examples of some sensor devices include, without limitation, microphones, cameras, e.g., video cameras, light sensors, motion sensors, thermal sensors. Sensor input can be used, e.g., by the sync module 220a and/or the sync controller 216, to determine whether synchronization should be initiated, and in at least some instances, to identify which device(s) should be synchronized, etc.

By way of illustrative example, an optional sensor 240a (FIG. 2), such as a microphone (shown in phantom), can detect audio within a vicinity of the first media processor 204a. When the second media processor 204b is presenting media content, it is possible under certain circumstances that the sensor 240a can detect audio from the second media processor 204b. This can occur, e.g., when the audio output of the second media processor 204b is within an audibly detectable range, e.g., earshot, of the first media processor 204a. Whether audio from the second media processor 204b is detectable at the first media processor 204a can depend upon numerous factors, such as spatial separation between the media processors 204a, 204b, a volume setting of the second media processor 204b and environmental conditions, such as whether doors between the media processors 204a, 204b are open/closed, home/building construction details, etc.

In at least some embodiments, the media processors 204a, 204b can communicate with each other and/or with a sync controller 216. Such communications can include information regarding one or more of a status of the media processor 204a, 204b, e.g., whether the media processor(s) 204a, 204b are power-on, what channel(s) they are tuned to, volume setting(s), programming (e.g., DVR) details and so forth. Continuing with the illustrative example, the first media processor 204a can determine whether the second media processor 204b is powered on and if so, whether it is tuned to the same channel, or otherwise presenting the same media content (e.g., from a prior DVR recording) as the first media processor 204. If so, then the first media processor 204 can determine from the sensor 240a, whether audio from the second media processor 204b is perceptible within a vicinity, e.g., in the same room as the first media processor 204a. If so, then a synchronization can be initiated to cause the media content to be presented in synchronization. Otherwise, synchronization may not be necessary.

In some embodiments, one of the first media processor 204a or the sync controller 216 can cause an identifying feature to be introduced to allow for a determination that detected audio at the sensor 240a is in fact resulting from audio presented at the second media processor 204b. For example, an identifying sound, such as a momentary sound, e.g., a pop, or a tone can be introduced locally, e.g., by the second media processor 204b, into the presented audio portion of the media content. Other identifying features can be a change in volume, e.g., increase and/or decrease, momentarily turning audio off, etc.

First and second playback latencies are determined at 304. In repose to one of the sync module 228a or the sync controller 116 receiving the synchronization request, the first media processor 204a can determine a first playback latency of a streaming media signal at the first media processor 204a. For example, the sync module 228a, whether receiving the synchronization request directly, e.g., from the user interface 232a, or remotely from the sync controller 216, determines the first playback latency. Likewise, the second media processor 204b can determine a second playback latency of the streaming media signal at the second media processor 204a.

To the extent that the synchronization request was initiated by a user at one of the media playback devices 204a, 204b, an instruction or suitable indication or command can be provided to the other device 204a, 204b, such that first and second playback latencies are determined for each of the devices. The instruction or command can be communicated, e.g., from one media playback device 204 to another. Alternatively or in addition, the instruction or command can be communicated from the sync controller 216 to each of the media processors 204.

Determination of the playback latency can be accomplished, e.g., at the media processor 204, by identifying a first playback time $t_1$ at which an in-content reference, e.g., provided within the streaming media, is encountered during playback at the first media processor. Likewise, a second playback time $t_2$ is determined when the in-content reference is encountered during playback at the second media processor. The process is repeated for all playback devices in a group of playback devices being synchronized, resulting in a number of playback latencies, one for each media playback device.

Determination of a respective playback time can be accomplished at each of media playback devices. For example, the sync module 228a can be configured to identify when the in-content reference is encountered during processing of the streaming media signal. In particular, the playback time provides an indication as to when media content at the in-content reference is displayed. For example, the sync module 228a can determine or otherwise approximate when the in-content reference is received according to input obtained from one or more of the decoder 220a, the buffer 220a, the video module 224a, or the audio module 226a. The sync module 228a associates a time reference, e.g., from the local time reference or clock 230a with the display of the in-content reference.

The sync controller 216 determines a first reference time $t_0$ at which the in-content reference is available for network transport to each of the first and second media processors. For example, the first reference time can be provided by one of the media server 208 a network transport device receiving media content from the media server, or a network element 210 in network communication between the media server 208 and the media processors 204. The respective playback latencies $\Delta_1$ can be determined as a difference between the first reference time: $\Delta_1=t_1-t_0$, $\Delta_2=t_2-t_0$, etc. Determination of the playback latencies can be accomplished, e.g., at the sync controller 216. Thus, the respective playback times are conveyed from the respective sync modules 228 to the sync controller 216, which computes the respective playback latencies by determining the respective differences. Alternatively or in addition, the playback latencies can be determined at one or more of the sync modules 228. In this instance, the first reference time is conveyed from the sync controller 216 to the sync module(s) 228, allowing the sync module(s) to determine the respective differences.

A target playback latency is determined at 306. The target playback latency can be determined by first determining a longest or greatest, e.g., maximum playback latency among all of the playback latencies determined for the media playback devices being synchronized: $\Delta_{max}=\text{MAX}(\Delta_1, \Delta_2, \ldots)$. In some embodiments, a target playback latency can be determined as the greatest or longest playback latency among the playback latencies. For example, if $\Delta_1=0.3$ seconds and $\Delta_2=0.7$ seconds, $\Delta_{MAX}$ is determined to be the greater value of the two, e.g., $\Delta_{MAX}=0.7$ seconds. A difference between each of the playback latencies and the longest playback latency can be determined as an synchronizing value for each of the media playback devices. For example, a synchronizing value for the first media playback device can be determined as: $\Delta_{SYNC\_1}=\Delta_{MAX}-\Delta_1$, or $\Delta_{SYNC\_1}=0.7-0.3$ sec., or $\Delta_{SYNC\_1}=0.4$ sec. By adding the synchronizing value, $\Delta_{SYNC\_1}$, to the playback latency of the first media playback device, $\Delta_1$, an adjusted offset can be determined for that device. The adjusted offset would be: $\Delta_1+\Delta_{SYNC}=0.3+0.4$ sec=0.7 sec. Repeating this process for each of the other media playback devices produces a respective offset that when added to the respective playback latency produces an uniform or equivalent adjusted offset. The adjusted offset, e.g., 0.4 sec, can be introduced into the playback stream of the first media playback device, e.g., by adjustment of a buffer or similar delay device, to realized synchronized playback between the first and second playback devices of the illustrative example. More likely, an additional time value δ is added, e.g., to accommodate for slight variations in operation of the media buffers. Thus, the target latency can be determined according to the following relationship: $\Delta_{target}=\Delta_{max}+\delta$. For a safe or padded value of 0.2 seconds, the target latency $\Delta_{target}$ would be 0.9 seconds (i.e., 0.7 seconds+0.2 seconds).

In some embodiments, a coordinated playback time of a target in-content timing element is determined at 308 according to the target playback latency $\Delta_{target}$. The coordinated playback time $t_{pb}$ can be determined, e.g., by adding the target playback latency to a second reference time $t_0'$ corresponding to a time at which the target in-content timing element is available for network transport: $t_{pb}=\Delta_{target}+t_0'$. Preferably the second reference time is determined at the same location as the first reference time, e.g., at the media server 208.

The coordinated playback time can be used to adjust a first buffer to playback the in-content timing element at the first media processor at the coordinated playback time 310. For example, the coordinate playback time $t_{pb}$, if determined at the sync controller 216, is forwarded from the sync controller 216 to sync modules 228 in each of the media playback devices 204. The sync modules 228 in each of the media playback devices 204 determines the target in-content reference, and having previously determined its playback latency, adjusts the buffer 222 to modify the playback latency such that the target in-content is presented at the coordinated playback time. In some embodiments, the target in-content reference is identified by the sync controller 216, e.g., identifying a particular in-content reference, such as a frame, a presentation time stamp, a sound sample, or an MPEG transport stream access unit. The coordinated playback time is also used to adjust buffers of other media playback devices being synchronized to playback the in-content timing element at the second media processor at the coordinated playback time 312.

The local time reference or clock 230 can include a clock that is updated or otherwise maintained to within a tolerable accuracy across multiple media playback devices of a network 100, 200. It is common for system time to be disseminated in a network, e.g., by receiving updates from a time server. The time server reads actual time from a reference clock and distributes this information, e.g., according to a Network Time Protocol (NTP), or Simple NTP (SNTP), to clients using a computer network. Any time reference would not be subject to streaming media processing and thus not subjected to at least a portion of the processing delays being accounted for by the synchronization techniques disclosed herein.

The buffer 222 can include one of a video buffer, an audio buffer, or a combined video and audio buffer. A video buffer, e.g., can be configured to buffer entire video frames, sending the video frames to the video module 224 for presentation at a display 234. Adjustment of the buffer, e.g., according to a buffer depth, can be used to control a time at which a particular video frame, or audio segment, is presented for playback.

Figure 4:
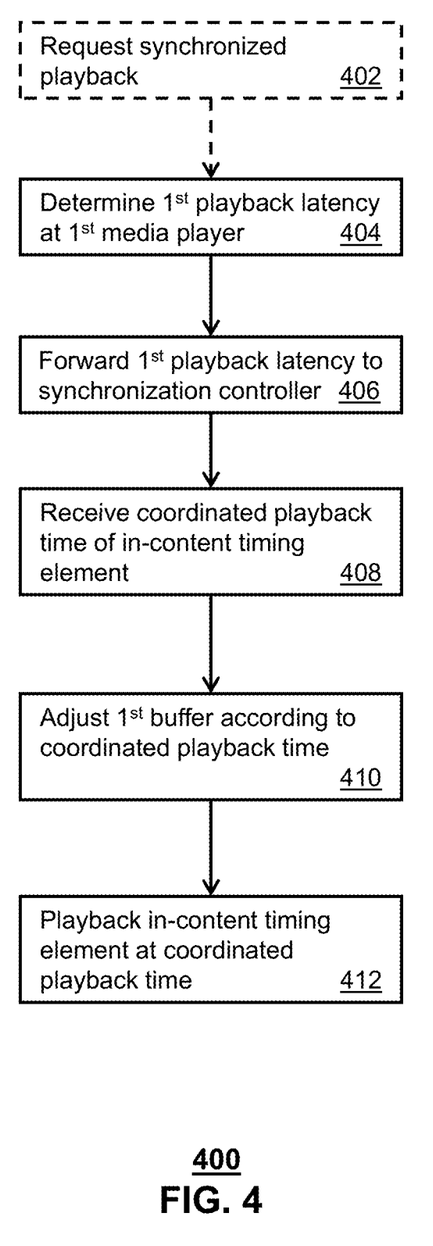
FIG. 4 depicts an illustrative alternative embodiment of a process used in portions of the system described in FIGS. 1-2.

FIG. 4 depicts an illustrative alternative embodiment of a process used in portions of the system described in FIGS. 1-2. A first playback latency is determined at a first media player at 404. The first playback latency $\Delta_1$ can be determined as a difference between a playback time $t_1$ associated with an in-content reference provided within the streaming media signal and a reference time $t_0$ at which the in-content reference was provided for network transport to the media playback devices 204. The reference time can be received from another device, such as the sync controller 216, the media server 208 or a network element 210.

The first playback latency is forwarded to the sync controller 216 at 406. The sync controller 216 can calculate a coordinated playback time $t_{pb}$, e.g., as disclosed above in reference to FIG. 4. The coordinated playback time of a target in-content timing element is received, e.g., by the sync module 228 at 408. The first buffer 222 is adjusted according to coordinated playback time at 410. For example, the sync module 228 of each media processor identifies the target in-content reference, and having previously determined the respective media processor's playback latency, adjusts the respective buffer 222 to modify the respective playback latency such that the target in-content is presented at the coordinated playback time at each of the media playback devices. Accordingly, playback of the in-content timing element occurs at coordinated playback time at 412 for all of the synchronized media playback devices.

Although the concept of a coordinated playback time tpb is disclosed above, similar results are possible without necessarily determining the coordinated playback time. In some embodiments, the individual playback latencies are conveyed to the sync controller 216 along with an identity, e.g., a device identification, of the associated media playback device. The sync controller 216, instead of calculating a coordinated playback time, can directly calculate buffer adjustments for each of the media playback devices. The buffer adjustments can be provided to the media playback devices allowing for the buffers to be adjusted thereby allowing for synchronized playback of the streaming media across all of the synchronized media processors.

The adjusted buffers can remain as adjusted above to allow for continued synchronized viewing of subsequent streaming media content at each of the synchronized media playback devices 204. The synchronization process can be repeated as disclosed herein, e.g., periodically according to a schedule, according to a request for synchronized playback at 402. The request can result from one or more of user action, such as selection of a sync command, or according to an event, such as channel change.

In some embodiments, a group of media playback devices are associated or otherwise identified as devices to be synchronized according to the techniques disclosed herein. Such associations can be determined by various methods, such as predetermination, e.g., during a configuration or set-up procedure. A subscriber to a synchronization service can configure or otherwise identify media playback devices to be synchronized, e.g., in a user profile. The devices can include each media playback device within the subscriber's home, the subscriber's mobile device(s) and/or mobile devices of others, such as the subscriber's family members, roommates, friends, etc.

Other techniques for associating the group of media playback devices can include one or more of user profile information, subscriber account information, e.g., media playback devices identified in a user account of a subscriber to one or more of network services, e.g., cable services, media delivery services, e.g., Netflix® and the like. Alternatively or in addition, the group of media playback devices can be associated according to information from another source, such as a global positioning services receiver of one or more of the media processors 204, a network element, such as a gateway, a router or wireless access point, and the like.

Preferably, synchronization accomplished by the techniques disclosed herein is provided according to a predetermined accuracy. Thus, synchronization need not be absolute, but merely imperceptible by a viewer/listener. Since video frames are typically presented at a rate of 30 frames per second, synchronization accuracy less than 1/30 second will ensure at least overlap of frame to frame. Likewise, slight delays in audio synchronization can be perceived as an echo, synchronization should be within a fraction of a second, e.g., less than 1/4 second, 1/8 second, 1/10 second or less. Preferably, synchronization accuracy will be measured in milliseconds, e.g., 100's, 10's or single digit millisecond accuracies.

Figure 5:
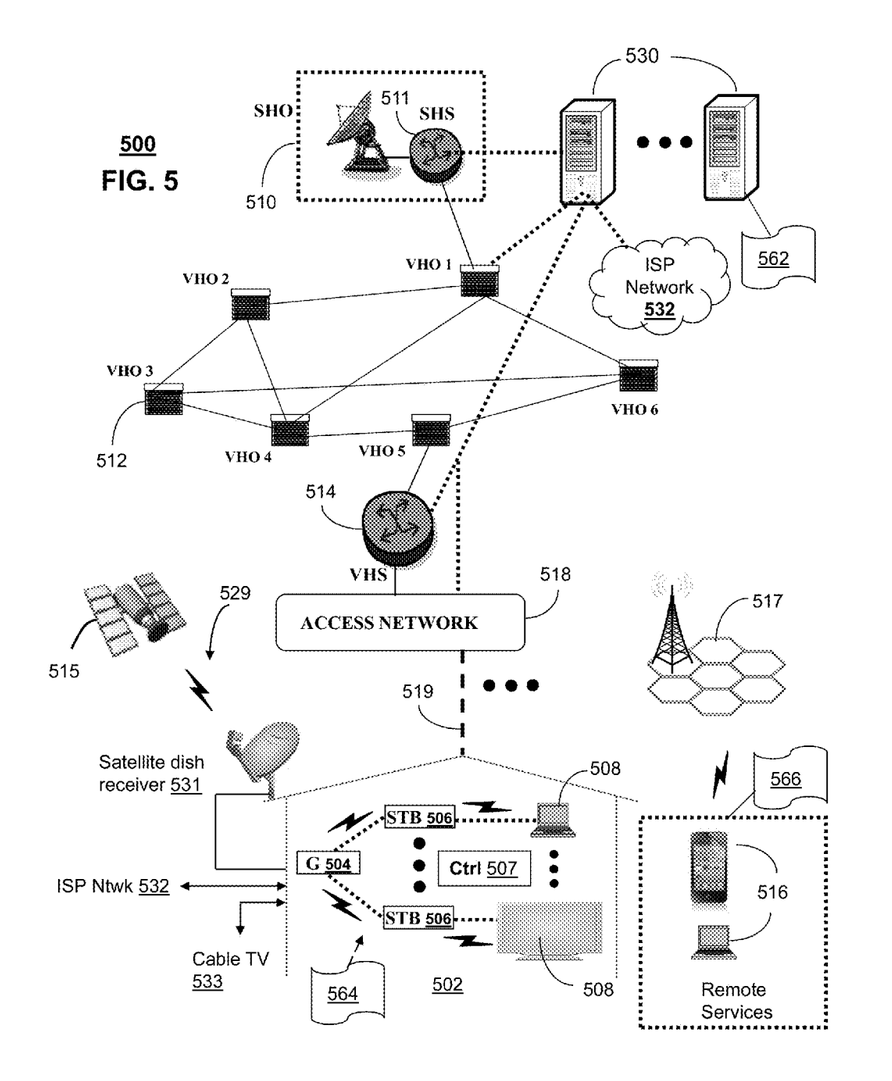
FIG. 5 depicts an illustrative embodiment of a communication system that provide media services with synchronized media playback as described in FIGS. 1-4.

FIG. 5 depicts an illustrative embodiment of a first communication system 500 for delivering media content. The communication system 500 can represent an Internet Protocol Television (IPTV) media system. Communication system 500 can be overlaid or operably coupled with the synchronized media playback network of FIGS. 1 and/or 2 as another representative embodiment of communication system 500. Playback latency values associated with a streaming media signal can be determined for each of a group of media processors. A target playback latency can be determined that is not less than a greatest one of the playback latency values, and a coordinated playback time can be determined according to the target playback latency. Buffers associated with the group of media processors can each be adjusted to cause a first in-content reference, provided within the streaming media signal, to be encountered at the coordinated time during playback at each of the multiple media processors.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a synchronization controller (herein referred to as sync controller 530) or a server 530 offering access to a sync controller and/or sync application. The sync controller 530 can use computing and communication technology to perform function 562, which can include among other things, determining a coordinated playback time according to playback latency values at each of the devices 506, 516. Alternatively or in addition, the media processors 506 and wireless communication devices 516 can be provisioned with software functions 564 and 566, respectively, to perform a synchronization control function in place of the sync controller 530, or to utilize the services of sync controller 530. For example, software functions 564 and/or 566 can include a selectable feature to allow a user of either device 506, 516 to initiate a request for synchronized streaming media playback. The software function 564 of the media processors 506 can be configured to measure or otherwise determine a first playback latency of a streaming media signal at the media processors 506. Likewise, the software function 566 can be configured to measure or otherwise determine a second playback latency of the streaming media signal at the communication device 516.

The software functions 564, 566 at each of the devices 506, 516 can cause the devices to provide the measured latency values to the sync controller 530, which can determine a target latency value and a coordinated playback time according to the techniques disclosed herein. The sync controller 530, in turn, can forward the coordinated playback time and in at least some instances, identification of an associated second in-content reference, to each of the devices 506. Upon receiving the coordinated playback time, and identification of the second in-content reference, when provided, each of the software functions 564, 566 can compute a buffer value that when applied to a media buffer causes playback of the second in-content reference to occur at the coordinated playback time at each of the devices 506, 516.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 5 depicts an illustrative embodiment of a communication system 500 employing an Internet protocol Multimedia Subsystem (IMS) network architecture to facilitate the combined services of circuit-switched and packet-switched systems. Communication system 500 can be overlaid or operably coupled with the synchronized media playback networks of FIGS. 1 and/or 2 and communication system 500 as another representative embodiment of communication system 500. Playback latency values associated with a streaming media signal can be determined for each of a group of media processors. A target playback latency can be determined that is not less than a greatest one of the playback latency values, and a coordinated playback time can be determined according to the target playback latency. Buffers associated with the group of media processors can each be adjusted to cause a first in-content reference, provided within the streaming media signal, to be encountered at the coordinated time during playback at each of the multiple media processors.

It is further appreciated that the CDs of FIG. 4 can operate as wireline or wireless devices. For example, the CDs of FIG. 4 can be communicatively coupled to a cellular base station 517, a femtocell, a WiFi router, a Digital Enhanced Cordless Telecommunications (DECT) base unit, or another suitable wireless access unit to establish communications with the network 500 of FIG. 5. The cellular access base station 517 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Figure 6:
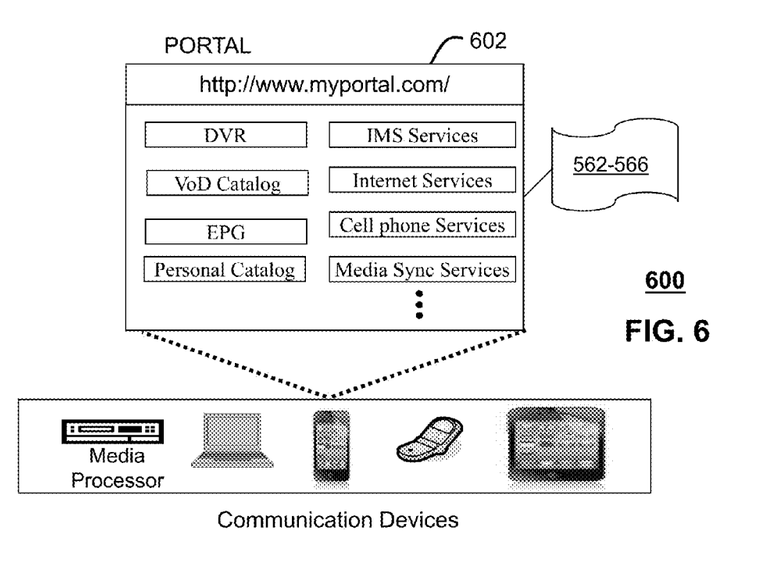
FIG. 6 depicts an illustrative embodiment of a web portal for interacting with the synchronized media playback networks of FIGS. 1-2 and the communication system providing media services with synchronized media playback of FIG. 5.

FIG. 6 depicts an illustrative embodiment of a web portal 602 which can be hosted by server applications operating from the computing devices 430 of the communication system 100 illustrated in FIG. 1. Communication system 600 can be overlaid or operably coupled with the synchronized media playback networks 100, 200 and/or the communication system 500 as another representative embodiment of the synchronized media playback network of FIGS. 1 and/or 2 and/or communication system 500. Playback latency values associated with a streaming media signal can be determined for each of a group of media processors. A target playback latency can be determined that is not less than a greatest one of the playback latency values, and a coordinated playback time can be determined according to the target playback latency. Buffers associated with the group of media processors can each be adjusted to cause a first in-content reference, provided within the streaming media signal, to be encountered at the coordinated time during playback at each of the multiple media processors. The web portal 602 can be used for managing services of communication systems 400-500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 602 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 602 can also be used for provisioning IMS services, provisioning Internet services, provisioning cellular phone services, configuring media synchronization services and so on.

The web portal 602 can further be utilized to manage and provision software applications 562-566 to adapt these applications as may be desired by subscribers and service providers of the synchronized media playback networks 100, 200 and the communication system 500.

Figure 7:
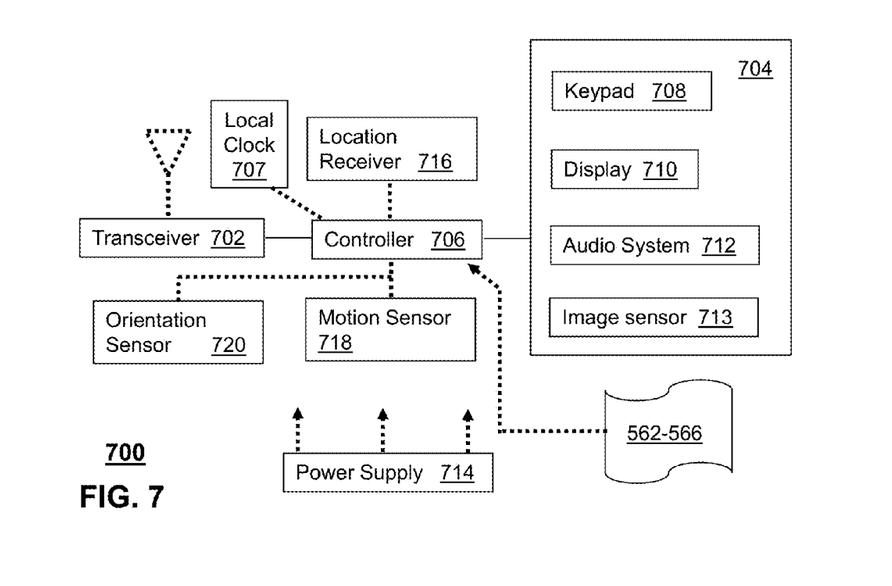
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1-2 and 5. Playback latency values associated with a streaming media signal can be determined for each of a group of media processors. A target playback latency can be determined that is not less than a greatest one of the playback latency values, and a coordinated playback time can be determined according to the target playback latency. Buffers associated with the group of media processors can each be adjusted to cause a first in-content reference, provided within the streaming media signal, to be encountered at the coordinated time during playback at each of the multiple media processors.

To enable these features, the communication device 700 can comprise a wireline and/or wireless transceiver 702 (herein transceiver 702), a user interface (UI) 704, a power supply 714, a location receiver 716, a motion sensor 718, an orientation sensor 720, a local time reference, such as a clock 707 and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of the synchronized media playback network of FIGS. 1-2 and communication system 500. In addition, the controller 706 can be adapted in various embodiments to perform the functions 562-566, respectively.

This Solution allows for time-synchronized video and/or audio playback across multiple devices in a single dwelling or area. Synchronization is achieved by taking into account the precise playback position information (present within any media object or stream) and tying it to system-wide playback at a specific system time. The techniques disclosed herein allow persons within a presentation venue, such as a household, to watch a media stream, e.g., live, at different areas of the house without perceptible audio misalignments that might otherwise exists due to the nature of processing digital video stream compression and long group of pictures and buffering needed to increase digital audio-video stream compression.

Upon reviewing the aforementioned embodiments, it would be evident to an artisan with ordinary skill in the art that said embodiments can be modified, reduced, or enhanced without departing from the scope of the claims described below. For example, the techniques disclosed herein can be extended to span more than one household, so friends or family can synchronized their audio-video consumption and interact and enjoy presentation of the same media between them in a synchronized manner. Alternatively or in addition, the techniques disclosed herein can be used to synchronize/resynchronize media stream consumption in which one or more digital recorders are involved. For example, persons in one room can replay a segment of a media stream, using the techniques disclosed herein to resynchronize with a broadcast of the program, e.g., a "live" feed, without disrupting the audio-video environment enjoyed by other's within ear shod and/or viewing range should the synchronization be between houses, or when switching to a second consumption digital device for extra content retrieval. Solutions can be expanded to also synchronize recorded media streams and/or media streams associated with communications. For example, the synchronization techniques disclosed herein can be applied to peer-to-peer communications, including unicast, e.g., two party calls, and/or multicast, e.g., multiparty calls. Application to Session Initiation Protocol (SIP) applications can determine a synchronization event, e.g., according to a SIP message, such as invite and/or join. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
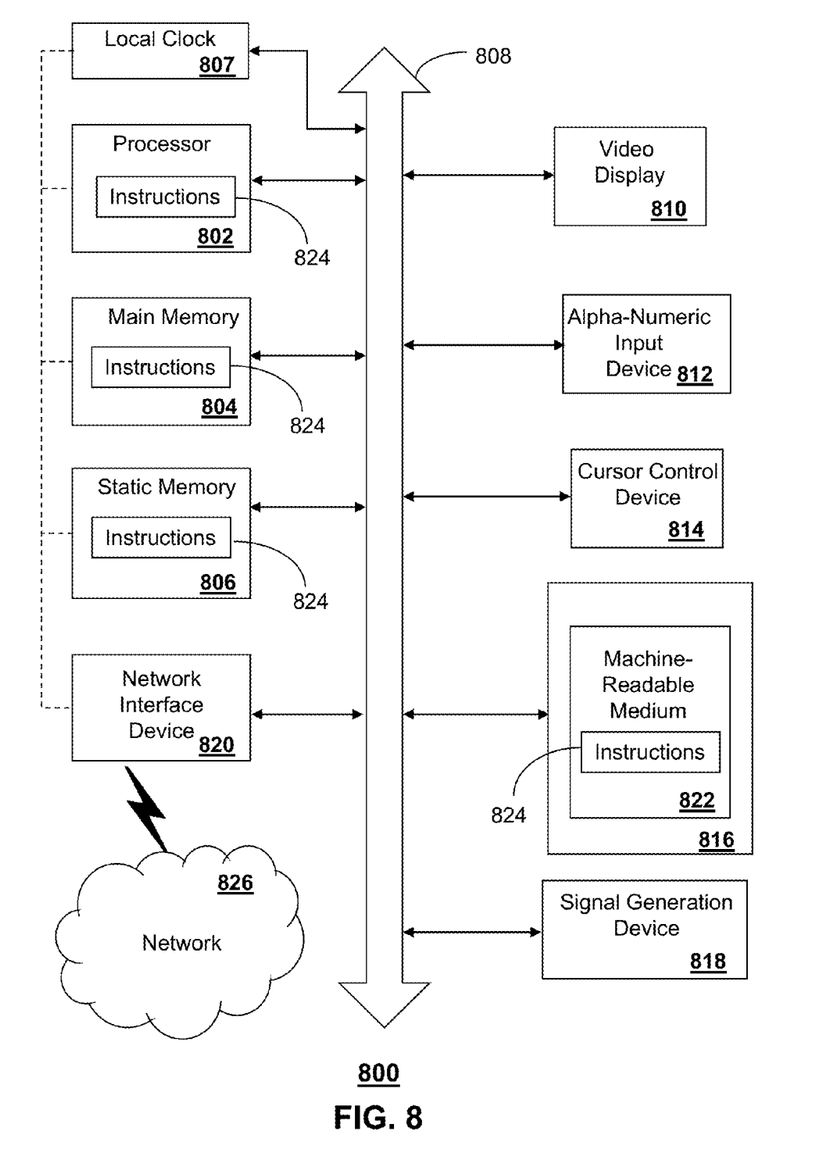
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the synchronization controller 116, 216, 530 the media processor 104, 106, 204, 504, 506, 516 and other devices of FIGS. 1-2 and 5-7. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

The computer system 800 can include a local time reference, such as a local clock 807. The clock can be configured, e.g., set and operable to maintain time with respect to a reference. The reference can be coordinated universal time, e.g., an external atomic clock, such as the National Institution of Standards and Technology (NIST) Internet Time Service (ITS), or some other time reference, such as a coordinated network time, e.g., as provided by a service provider. Network time can be configurable according to a network time protocol, such as the Simple Network Time Protocol (SNTP). The local clock 807 can be configured periodically, e.g., upon power cycles, daily, hourly, and so forth, to maintain a desired accuracy with respect to a separate time reference.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method, comprising:
  receiving, by a controller comprising a processor, a synchronization request; and
  in response to the receiving of the synchronization request:
    determining, by the controller, a first playback latency of a streaming media signal at a first media processor;

determining, by the controller, a second playback latency of the streaming media signal at a second media processor;
determining, by the controller, a greater of the first and second playback latencies; and
determining, by the controller, according to the greater of the first and second playback latencies, a coordinated playback time at which a first in-content reference is to be encountered during playback,
wherein a first buffer, when adjusted by a first buffer value, causes the first in-content reference to be encountered at the coordinated time during playback by the first media processor, and
wherein a second buffer, when adjusted by a second buffer value, causes the first in-content reference to be encountered at the coordinated time during playback by the second media processor, resulting in a synchronized playback of the streaming media between the first and second media processors.

2. The method of claim 1, wherein the determining of the first and second playback latencies comprises:
identifying, by the controller, a second in-content reference within the streaming media signal;
determining, by the controller, a reference time at which the second in-content reference is available for network transport to each of the first and second media processors;
determining, by the controller, a first playback time at which the second in-content reference is encountered during playback at the first media processor;
determining, by the controller, a second playback time at which the second in-content reference is encountered during playback at the second media processor;
determining, by the controller, the first playback latency as a first difference between the first playback time and the reference time; and
determining, by the controller, the second playback latency as a second difference between the second playback time and the reference time.

3. The method of claim 2, wherein the first playback time is received from the first media processor and the second playback time is received from the second media processor, wherein the first media processor comprises a first time reference and the second media processor comprises a second time reference, wherein the first and second time references are synchronized.

4. The method of claim 1, wherein the synchronization request is generated by one of the first and second media processors in response to an event associated with the one of the first and second media processors.

5. The method of claim 4, wherein the event is selected from a group consisting of a power-on event, a channel-change event, a selection of a menu item, or a time value.

6. The method of claim 1, further comprising adding, by the controller, a delay offset to the greater of the first and second playback latencies, wherein the determining of the coordinated playback time is according to the greater of the first and second playback latencies adjusted by the delay offset.

7. The method of claim 1, wherein the in-content reference comprises one of a frame, a presentation time stamp, a sound sample, or an MPEG transport stream access unit.

8. A machine-readable storage device, comprising instructions, wherein execution of the instructions causes a processor to perform operations comprising:
determining a first playback latency of a streaming media signal at a first media processor;
determining a second playback latency of the streaming media signal at a second media processor;
determining a target playback latency not less than a greater of the first playback and second playback latencies; and
determining a coordinated playback time according to the target playback latency,
wherein a first buffer, when adjusted by a first buffer value, causes a first in-content reference to be encountered at the coordinated time during playback by the first media processor, and
wherein a second buffer, when adjusted by a second buffer value, causes the first in-content reference to be encountered at the coordinated time during playback by the second media processor, resulting in a synchronized playback of the streaming media between the first and second media processors.

9. The machine-readable storage device of claim 8, wherein the determining of the first and second playback latencies comprises:
identifying a second in-content reference within the streaming media signal;
determining a reference time at which the second in-content reference is available for network transport to each of the first and second media processors;
determining a first playback time at which the second in-content reference is encountered during playback at the first media processor;
determining a second playback time at which the second in-content reference is encountered during playback at the second media processor;
determining the first playback latency as a first difference between the first playback time and the reference time; and
determining the second playback latency as a second difference between the second playback time and the reference time.

10. The machine-readable storage device of claim 9, wherein the first playback time is received from the first media processor and the second playback time is received from the second media processor, wherein the first media processor comprises a first time reference and the second media processor comprises a second time reference, wherein the first and second time references are synchronized.

11. The machine-readable storage device of claim 8, further comprising receiving a synchronization request from one of the first and second media processors in response to an event associated with the one of the first and second media processors, wherein the determining of the first and second playback latencies is responsive to the synchronization request.

12. The machine-readable storage device of claim 11, wherein the event is selected from a group consisting of a power-on event, a channel-change event, a selection of a menu item, or a time value.

13. The machine-readable storage device of claim 8, wherein the in-content reference comprises one of a frame, a presentation time stamp, a sound sample, or an MPEG transport stream access unit.

14. A device, comprising:
a memory to store executable instructions; and
a processor coupled to the memory, wherein the processor, responsive to executing the instructions, performs operations comprising:

determining a first playback latency of a streaming media signal at a first media processor and a second playback latency of the streaming media signal at a second media processor;

determining a target playback latency not less than a greater of the first and second playback latencies; and determining a coordinated playback time according to the target playback latency, wherein a first buffer, when adjusted by a first buffer value, causes a first in-content reference to be encountered at the coordinated time during playback by the first media processor, and wherein a second buffer, when adjusted by a second buffer value, causes the first in-content reference to be encountered at the coordinated time during playback by the second media processor, resulting in a synchronized playback of the streaming media between the first and second media processors.

15. The device of claim 14, wherein the determining of the first and second playback latencies comprises:

identifying a second in-content reference within the streaming media signal;

determining a reference time at which the second in-content reference is available for network transport to each of the first and second media processors;

determining a first playback time at which the second in-content reference is encountered during playback at the first media processor;

determining a second playback time at which the second in-content reference is encountered during playback at the second media processor;

determining the first playback latency as a first difference between the first playback time and the reference time; and determining the second playback latency as a second difference between the second playback time and the reference time.

16. The device of claim 15, wherein the first playback time is received from the first media processor and the second playback time is received from the second media processor, wherein the first media processor comprises a first time reference and the second media processor comprises a second time reference, wherein the first and second time references are synchronized.

17. The device of claim 14, further comprising receiving a synchronization request from one of the first and second media processors in response to an event associated with the one of the first and second media processors, wherein the determining of the first and second playback latencies is responsive to the synchronization request.

18. The device of claim 17, wherein the event is selected from a group consisting of a power-on event, a channel-change event, a selection of a menu item, or a time value.

19. The device of claim 14, further comprising adding a delay offset to the greater of the first and second playback latencies, wherein the determining of the coordinated playback time is according to the greater of the first and second playback latencies adjusted by the delay offset.

20. The device of claim 14, wherein the in-content reference comprises one of a frame, a presentation time stamp, a sound sample, or an MPEG transport stream access unit.

* * * * *